United States Patent
Fukaya et al.

(10) Patent No.: US 10,527,040 B2
(45) Date of Patent: Jan. 7, 2020

(54) FLUID MACHINE FOR VEHICLE

(71) Applicant: KABUSHIKI KAISHA TOYOTA JIDOSHOKKI, Kariya-shi, Aichi-ken (JP)

(72) Inventors: Yoshihiro Fukaya, Aichi-ken (JP); Yoshikazu Fukutani, Aichi-ken (JP); Shinji Tsubai, Aichi-ken (JP); Hirofumi Kuma, Aichi-ken (JP)

(73) Assignee: KABUSHIKI KAISHA TOYOTA JIDOSHOKKI, Kariya-shi, Aichi-ken (JP)

(*) Notice: Subject to any disclaimer, the term of this patent is extended or adjusted under 35 U.S.C. 154(b) by 195 days.

(21) Appl. No.: 15/714,464

(22) Filed: Sep. 25, 2017

(65) Prior Publication Data
US 2018/0087511 A1    Mar. 29, 2018

(30) Foreign Application Priority Data
Sep. 29, 2016 (JP) ................. 2016-192036

(51) Int. Cl.
*F04C 23/00* (2006.01)
*F04C 18/02* (2006.01)
*H02K 11/33* (2016.01)

(52) U.S. Cl.
CPC ........ *F04C 23/008* (2013.01); *F04C 18/0215* (2013.01); *F04C 2210/26* (2013.01); *F04C 2240/30* (2013.01); *F04C 2240/803* (2013.01); *F04C 2240/808* (2013.01); *H02K 11/33* (2016.01)

(58) Field of Classification Search
CPC .................. F04C 23/008; F04C 18/0215; F04C 2240/30; F04C 2240/803; F04C 2240/808
See application file for complete search history.

(56) References Cited

U.S. PATENT DOCUMENTS

| 8,152,490 B2* | 4/2012 | Iguchi | F04C 18/0215 417/410.1 |
| 2006/0083649 A1* | 4/2006 | Makino | F04C 23/008 418/55.6 |
| 2009/0104055 A1 | 4/2009 | Satou et al. | |

FOREIGN PATENT DOCUMENTS

| JP | 2004-324494 A | 11/2004 |
| JP | 2009-97473 A | 5/2009 |

(Continued)

*Primary Examiner* — Peter J Bertheaud
(74) *Attorney, Agent, or Firm* — Sughrue Mion, PLLC

(57) ABSTRACT

A fluid machine for a vehicle includes a rotary shaft, an electric motor having a coil, a drive circuit, and a housing having therein a motor chamber and a circuit chamber. The housing includes a partitioning wall partitioning between the motor chamber and the circuit chamber and a peripheral wall extending from the partitioning wall. The partitioning wall and the peripheral wall form the circuit chamber. The drive circuit includes a circuit board having a surface and an electronic component mounted on the surface of the circuit board. A connecting terminal is disposed extending through the partitioning wall and electrically connecting the coil with the drive circuit. A mounting lug is formed extending from the peripheral wall so as to mount the housing to the vehicle. The electronic component, the connecting terminals and the mounting lug are disposed in this order in the radial direction of the rotary shaft.

4 Claims, 3 Drawing Sheets

(56) References Cited

FOREIGN PATENT DOCUMENTS

| JP | 2012-127328 A | 7/2012 |
| JP | 2016-960 A | 1/2016 |

\* cited by examiner

FLUID MACHINE FOR VEHICLE

BACKGROUND OF THE INVENTION

The present invention relates to a fluid machine for a vehicle.

Japanese Patent Application Publication 2004-324494 discloses a fluid machine for a vehicle that includes a rotary shaft, an electric motor driving to rotate the rotary shaft, a drive circuit driving the electric motor, and a housing accommodating therein the electric motor and the drive circuit. The fluid machine of the above-cited Publication further includes a connecting terminal that connects the electric motor with the drive circuit.

If any external force is applied to the housing, for example, by the traffic collision, the housing may be deformed. In such case, the deformed housing may come into contact with the connecting terminal, thus causing a short circuit between the housing and the connecting terminal. In order to prevent such problem, the electric compressor may be provided with a protector that protects the connecting terminal. If the compressor has such protector, however, the number of parts is increased because the protector and an additional fixing part that is used to fix the protector to the housing are needed.

The present invention, which has been made in light of the above problems, is directed to providing a fluid machine for a vehicle that permits protection of a connecting terminal without increasing the number of parts.

SUMMARY OF THE INVENTION

In accordance with an aspect of the present invention, there is provided a fluid machine for a vehicle including a rotary shaft, an electric motor rotating the rotary shaft and having a coil, a drive circuit driving the electric motor, and a housing having therein a motor chamber that accommodates therein the electric motor and a circuit chamber that accommodates therein the drive circuit. The motor chamber and the circuit chamber are disposed along an axial direction of the rotary shaft. The housing includes a partitioning wall that partitions between the motor chamber and the circuit chamber and a peripheral wall that extends from the partitioning wall in the axial direction of the rotary shaft, and the partitioning wall and the peripheral wall cooperates to form the circuit chamber. The drive circuit includes a circuit board having a surface that faces the partitioning wall and an electronic component mounted on the surface of the circuit board. The fluid machine has a connecting terminal disposed extending through the partitioning wall and electrically connecting the coil with the drive circuit. A mounting lug is formed extending from the peripheral wall so as to mount the housing to the vehicle. The electronic component, the connecting terminals and the mounting lug are disposed in this order in the radially outward direction with respect to the rotary shaft.

DETAILED DESCRIPTION OF THE EMBODIMENTS

The following will describe an electric compressor mounted on a vehicle with reference to the accompanying drawings. The electric compressor corresponds to the fluid machine for the vehicle according to the present invention. The electric compressor is used for a vehicle air conditioner and configured to compress a refrigerant.

Figure 1:
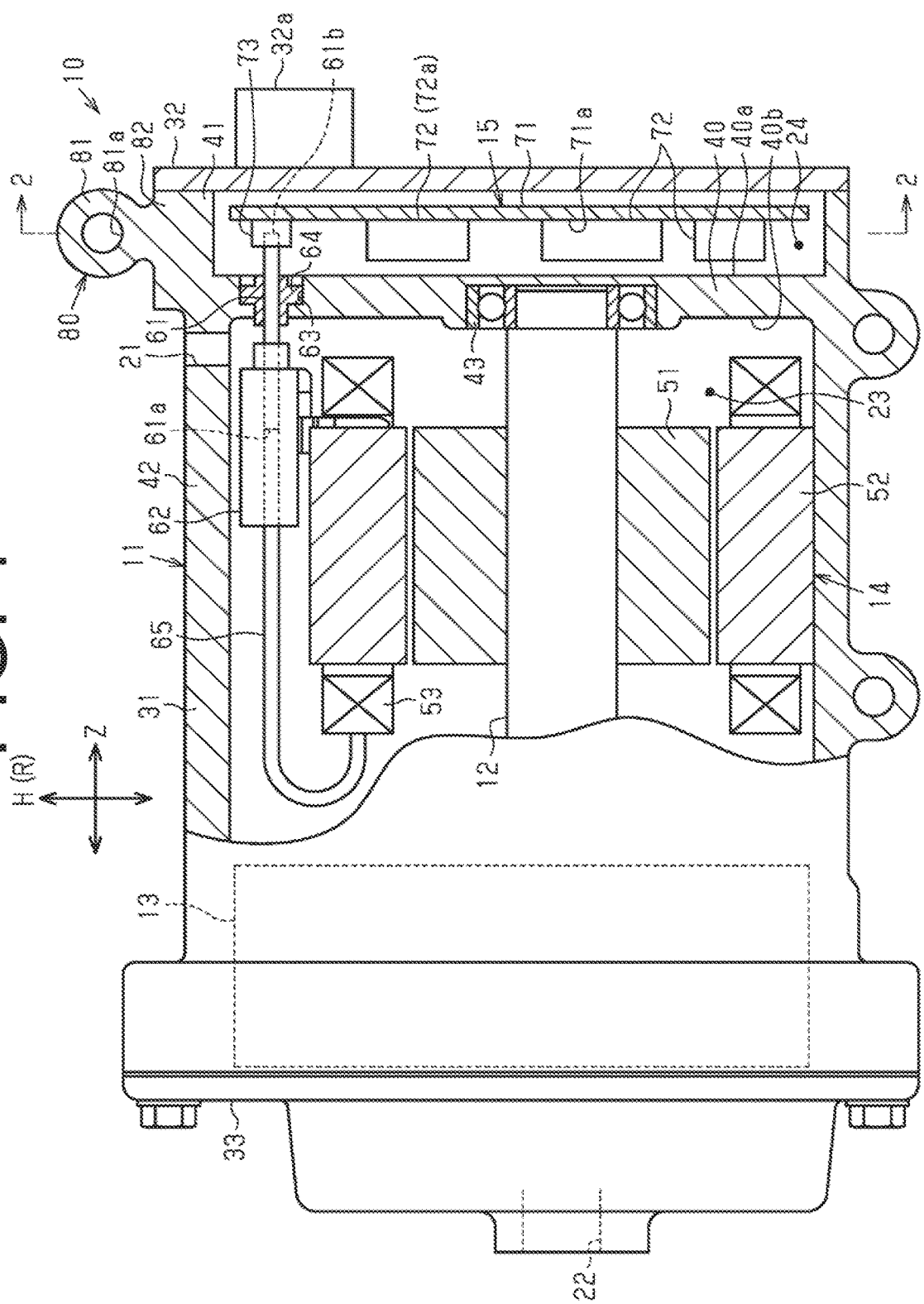
FIG. 1 is a schematic longitudinal sectional view of an electric compressor corresponding to a fluid machine for a vehicle according to the present invention.

Referring to FIG. 1, there is shown an electric compressor 10 including a housing 11, a rotary shaft 12, a compression part 13, an electric motor 14 and an inverter 15 serving as a driving circuit. The housing 11 has a generally cylindrical shape and has an inlet port 21 and a discharge port 22 through which fluid is drawn in and discharged out, respectively. The housing 11 has therein a motor chamber 23 accommodating therein the electric motor 14 and an inverter chamber 24, or a circuit chamber, accommodating therein the inverter 15. The rotary shaft 12, the compression part 13 and the electric motor 14 are accommodated in the motor chamber 23. The inverter 15 and the inverter chamber 24 correspond to the driving circuit that drives the electric motor and the circuit chamber, respectively, according to the present invention.

The housing 11 includes a cylindrical main housing 31 having openings on opposite ends thereof in the axial direction, a cover 32 and a discharge housing 33 that are fixed to the opposite axial ends of the main housing 31.

The main housing 31 is made of a conductive material such as aluminum. The main housing 31 includes a partitioning wall 40 that partitions between the motor chamber 23 and the inverter chamber 24 and first and second peripheral walls 41, 42 that are formed extending perpendicularly to the partitioning wall 40.

The partitioning wall 40 is of a plate shape, more specifically a disk shape having a thickness extending in the axial direction of the housing 11 and has first and second wall surfaces 40a, 40b disposed on the opposite sides of the partitioning wall 40 with respect to the thickness direction thereof.

The first peripheral wall 41 is formed extending perpendicularly from the outer periphery of the first surface 40a and has an annular shape as seen in the thickness direction of the partitioning wall 40. The second peripheral wall 42 is formed extending perpendicularly from the outer periphery of the second surface 40b, which is opposite from the first surface 40a, and has an annular shape as seen in the thickness direction of the partitioning wall 40. In other words, the second peripheral wall 42 extends in a direction that is opposite from a direction in which the first peripheral wall 41 extends. The openings of the main housing 31 on the opposite ends thereof are formed by the distal ends of the first and second peripheral walls 41, 42, respectively.

The cover 32 is fixed to the main housing 31 on the side thereof that is adjacent to the first peripheral wall 41. The cover 32 is disposed so as to close the opening of the main housing 31 formed by the first peripheral wall 41. The inverter chamber 24 is defined by the first surface 40a, the first peripheral wall 41 and the cover 32. In other words, the first peripheral wall 41, the partitioning wall 40 and the cover 32 cooperate to form the inverter chamber 24 in the housing 11. An external connector 32a that electrically connects the inverter 15 with on-board equipment is mounted on the outer surface of the cover 32.

The discharge housing 33 is fixed to the main housing 31 on the side thereof that is adjacent to the second peripheral wall 42. The discharge housing 33 is disposed so as to close the opening of the main housing 31 formed by the second peripheral wall 42. The motor chamber 23 is formed by the second surface 40b, the second peripheral wall 42 and the discharge housing 33.

The inlet port 21 is formed through the second peripheral wall 42 of the main housing 31 and the discharge port 22 is formed through the discharge housing 33, so that fluid is flowed through the motor chamber 23. The partitioning wall 40 prevents fluid in the motor chamber 23 from flowing into the inverter chamber 24.

The rotary shaft 12 is rotatably supported in the housing 11. Specifically, the rotary shaft 12 has one end thereof supported by a bearing 43 that is formed in the partitioning wall 40 and the other end thereof rotatably connected to the compression part 13. The axial direction Z of the rotary shaft 12 coincides with the axial direction of the housing 11 and the thickness direction of the partitioning wall 40. The motor chamber 23 and the inverter chamber 24 are disposed side by side in the axial direction Z of the rotary shaft 12. Thus, the first peripheral wall 41 and the second peripheral wall 42 extend in the axial direction Z of the rotary shaft 12.

The compression part 13 is driven by the rotation of the rotary shaft 12. More specifically, fluid which is flowed from the motor chamber 23 into the compression part 13 is compressed with the rotation of the rotary shaft 12 and the compressed fluid is discharged through the discharge port 22. It is to be noted that any type of compression part such as a scroll type, a vane type and roots type may be used for the compression part 13

The electric motor 14 is disposed between the compression part 13 and the inverter 15. In other words, the electric compressor 10 of the present embodiment is of an in-line type in which the compression part 13, the electric motor 14 and the inverter 15 is disposed along the axial direction Z of the rotary shaft 12.

The electric motor 14 includes a rotor 51 that is rotatable with the rotary shaft 12, a stator 52 that is disposed radially outward of the rotor 51 and fixed to the housing 11 and a plurality of coils 53 that are wound around the stator 52.

The coils 53 include three coils and cooperate to form a three phase coil. It is to be noted that the number of phases of the coils 53, or the phases of the electric motor 14, is not limited to three.

As shown in FIG. 1, the electric compressor 10 includes a plurality of connecting terminals 61 and a cluster block 62 for electrically connecting the coils 53 and the inverter 15.

Each connecting terminal 61 is of a hermetic type and disposed extending through the partitioning wall 40. Specifically, the connecting terminal 61 is fixed by a non-conductive support member 64 that is inserted airtightly in a hole 63 formed through the partitioning wall 40 in the width direction thereof. The connecting terminal 61 is inserted through and supported by the support member 64. The connecting terminal 61 extends through the partitioning wall 40 with one end thereof, or a coil side end 61a located in the motor chamber 23 and the other end thereof, or an inverter side end 61b, located in the inverter chamber 24, respectively.

Figure 2:
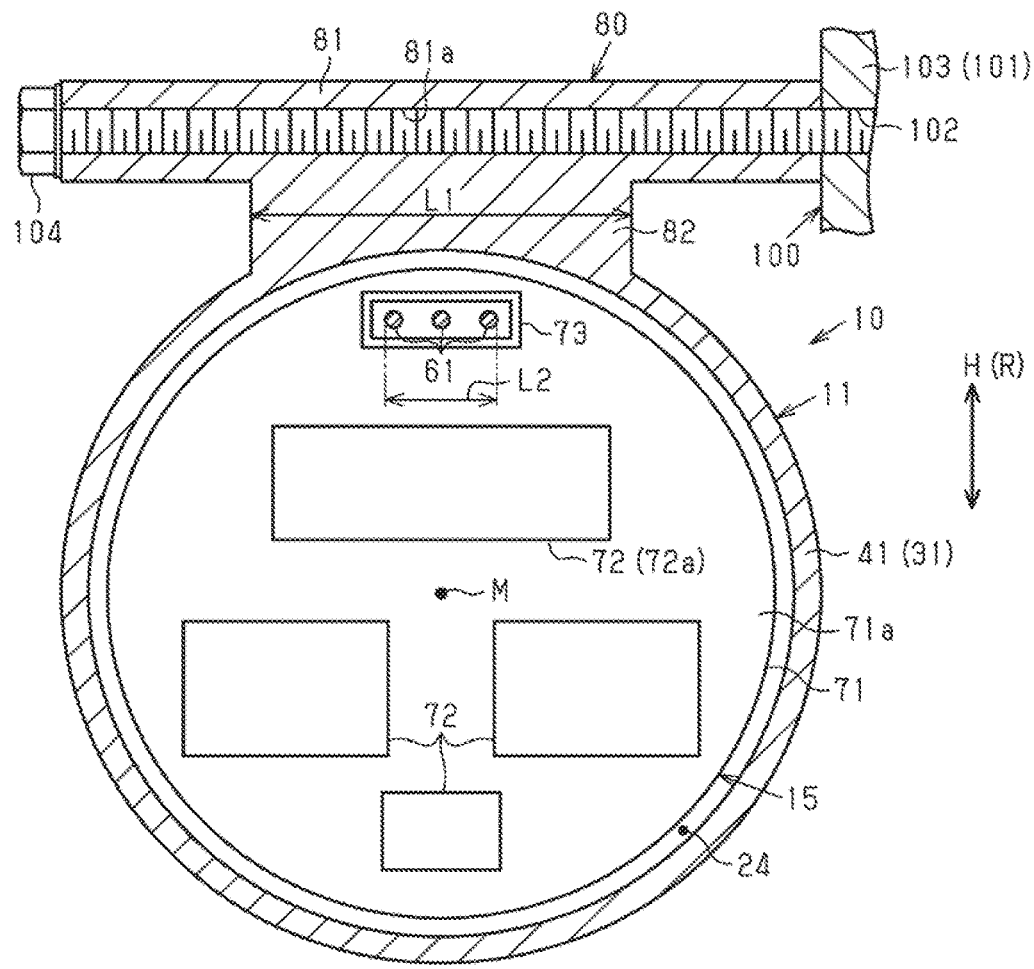
FIG. 2 is a cross-sectional view of the electric compressor taken along line II-II of FIG. 1.

According to the present embodiment, three connecting terminal 61 are provided so as to correspond to the respective coils 53, or the number of phases, as shown in FIG. 2. The connecting terminals 61 are disposed in line at a predetermined spaced interval.

As shown in FIG. 1, the cluster block 62 is mounted to the stator 52. The cluster block 62 connects three lead wires 65 extending out from the three coils 53 to their corresponding three connecting terminals 61 (specifically to coil ends 61a).

As shown in FIGS. 1 and 2, the inverter 15 includes a circuit board 71, a plurality of electronic components 72 and a connector 73. The electronic components 72 and the connector 73 are shown in front view in FIG. 2. The circuit board 71 has a disk shape having a diameter slightly smaller than that of a circle formed by the inner surface of the first peripheral wall 41. The thickness direction of the circuit board 71 coincides with the thickness direction of the partitioning wall 40. The circuit board 71 has a surface 71a facing the first surface 40a of the partitioning wall 40. The surface 71a corresponds to one board surface of the circuit board 71.

The electronic components 72 are mounted on the surface 71a of the circuit board 71 and disposed between the circuit board 71 and the first surface 40a of the partitioning wall 40. In the present embodiment, the electronic components 72 include a coil, a capacitor, a power module and various sensors.

It is noted that one of the electronic components 72 that is disposed closest to the connector 73 will be referred to as a specific electronic component 72a. According to the present embodiment, the specific electronic component 72a is disposed with at least a part of the specific electronic component 72a positioned between the center M of the circuit board 71 and the connector 73.

The connector 73 is disposed between the specific electronic component 72a and the first peripheral wall 41. The connector 73 is disposed at a position that is closer to the outer periphery of the circuit board 71 than to the center M of the circuit board 71. The connector 73 is positioned so as to face the hole 63 formed through the partitioning wall 40 in the axial direction Z of the rotary shaft 12. The connector 73 is electrically connected to the electronic components 72 via a wiring pattern formed on the circuit board 71. The inverter side end 61b of the connecting terminal 61 is connected to the connector 73, so that the electronic components 72 of the inverter 15 and the coils 53 are electrically connected.

As shown in FIGS. 1 and 2, the main housing 31 is formed with a mounting lug 80 that is used to mount the housing 11 to a vehicle 100. The mounting lug 80 is formed extending from the first peripheral wall 41 on the side thereof that is opposite from the electronic components 72 (specific electronic component 72a) with respect to the connecting terminal 61. The connecting terminals 61 are disposed between the mounting lug 80 and the specific electronic component 72a.

In the following description, the direction which passes through the center M of the circuit board 71 and along which the connecting terminals 61 and the mounting lug 80 are arranged will be referred to as parts arrangement direction H. The parts arrangement direction H extends from the center M of the circuit board 71 towards the connecting terminal 61 and coincides with radial direction R of the rotary shaft 12. The electronic component 72 (specific electronic component 72a in the present embodiment), the connecting terminals 61 and the mounting lug 80 are arranged in the parts arrangement direction H.

As shown in FIG. 2, the electronic components 72 (specific electronic component 72a in the present embodiment), the connecting terminal 61 and the mounting lug 80 are disposed in this order in the radial direction R of the rotary shaft 12 from the inner toward the outer side of the electric compressor 10, or in the radially outward direction with respect to the drive shaft 12.

The mounting lug 80 includes a body portion 81 and a connecting portion 82 that connects the body portion 81 with the first peripheral wall 41. The body portion 81 is disposed so as to face the first peripheral wall 41. Specifically, the body portion 81 is disposed outward of the first peripheral wall 41 with respect to the radial direction R of the rotary shaft 12. The body portion 81 has therethrough a hole 81a extending perpendicularly to the parts arrangement direction H and also to the axial direction Z of the rotary shaft 12. The hole 81a has a cylindrical shape as seen in the extending direction of the hole 81a of the body portion 81. The dimension of the body portion 81 in the extending direction of the hole 81a is substantially the same as the diameter of the housing 11.

The connecting portion 82 is formed projecting from the first peripheral wall 41 in the parts arrangement direction H and extending in the extending direction of the hole 81a. The connecting portion 82 connects radially outward part of the first peripheral wall 41 with respect to the connecting terminal 61 with the body portion 81. According to the present embodiment, the parts arrangement direction H corresponds to the projecting direction of the connecting portion 82.

As shown in FIG. 2, the connecting terminals 61 are arranged along, or generally the same direction as, the extending direction of the connecting portion 82. L1 indicates dimension of the connecting portion 82 in its extending direction, which is greater than L2 that indicates the dimension corresponding to the distance between the two outermost connecting terminals 61.

Figure 3:
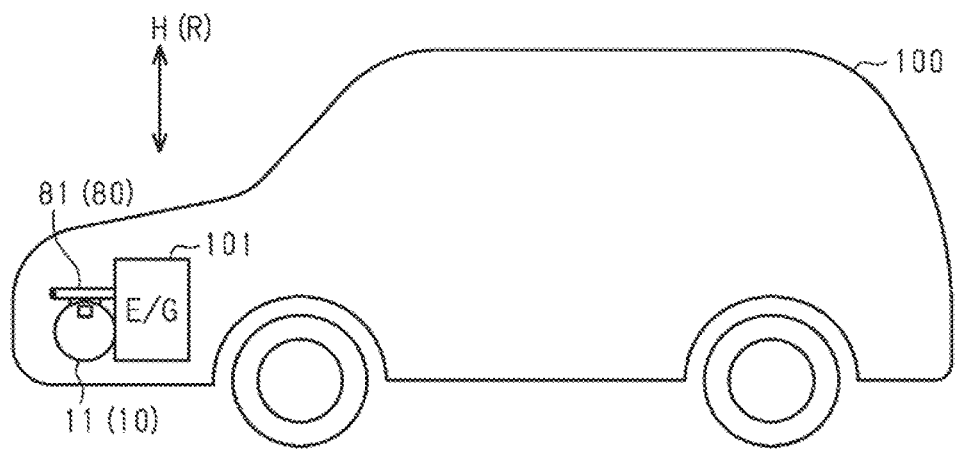
FIG. 3 is a schematic view of the vehicle on which the electric compressor of FIG. 1 is mounted.

As shown in FIGS. 2 and 3, the electric compressor 10 is mounted to the engine 101 of the vehicle 100. The engine 101 has a mounting portion 103 having therein a hole 102. The hole 81a of the body portion 81 of the mounting lug 80 is disposed in alignment with the hole 102. In such state, a bolt 104 is inserted through the hole 81a and screwed in the hole 102, thus the electric compressor 10 being mounted to the vehicle 100. In other words, the housing 11 is mounted to the vehicle 100 by the bolt 104 inserted through the hole 81a of the mounting lug 80.

As shown in FIG. 3, the electric compressor 10 is disposed frontward of the engine 101 and mounted to the vehicle 100 in such an orientation that the extending direction of the hole 81a of the body portion 81 of the mounting lug 80 coincides with the front-rear direction of the vehicle 100. In this case, the axial direction Z of the rotary shaft 12 coincides with the lateral direction of the vehicle 100. With the electric compressor 10 mounted to the vehicle 100, the mounting lug 80 is positioned above the housing 11 with respect to the vertical direction thereof and the parts arrangement direction H coincides with the vertical direction of the housing 11.

The following will describe the operation effect of the present embodiment. In case of a frontal collision of the vehicle 100, an external force is applied to the housing 11 of the electric compressor 10 in the extending direction of the hole 81a of the mounting lug 80. Part of the first peripheral wall 41 that is disposed radially outward of the connecting terminals 61 is formed with the mounting lug 80 and is stronger than the rest of the first peripheral wall 41 and, therefore, less likely to be deformed, so that the connecting terminals 61 and the first peripheral wall 41 are prevented from contacting each other.

The embodiment of the present invention offers the following effects.

(1) The electric compressor 10 includes the rotary shaft 12, the electric motor 14 that rotates the rotary shaft 12 and has the coils 53, the inverter 15 that drives the electric motor 14, and the housing 11 that accommodates therein the rotary shaft 12, the electric motor 14 and the inverter 15. The motor chamber 23 and the inverter chamber 24 are defined in the housing 11 along the axial direction Z of the rotary shaft 12. The housing 11 includes the partitioning wall 40 that partitions between the motor chamber 23 and the inverter chamber 24 and the first peripheral wall 41 that extends in the axial direction Z of the rotary shaft 12. The partitioning wall 40 and the first peripheral wall 41 cooperate to form the inverter chamber 24. The inverter 15 includes the circuit board 71 having the surface 70a facing the partitioning wall 40 and the electronic components 72 mounted on the surface 71a of the circuit board 71 facing the partitioning wall 40.

In this electric compressor 10, the connecting terminals 61 are formed extending through the partitioning wall 40 so as to electrically connect the coils 53 with the inverter 15. The mounting lug 80 is formed extending from the first peripheral wall 41 so as to mount the housing 11 to the vehicle 100. The specific electronic component 72a, which is provided as one of the electronic components 72, the connecting terminals 61 and the mounting lug 80 are disposed in this order in the radially outward direction with respect to the rotary shaft 12. According to the electric compressor 10 in which the strength of the first peripheral wall 41 at the part thereof radially outward of the connecting terminals 61 is increased by the provision of the mounting lug 80, the connecting terminal 61 and the first peripheral wall 41 are prevented from contacting each other in the event that any external force is applied to the housing 11 of the electric compressor 10. Therefore, the connecting terminal 61 and the first peripheral wall 41 may be protected against a short circuit without providing any additional part specifically designed to protect the connecting terminal 61. Thus, the connecting terminal 61 may be protected without increasing the number of parts.

(2) The mounting lug 80 includes the body portion 81 that is formed with the hole 81a that extends perpendicular to the parts arrangement direction H and also to the axial direction Z of the rotary shaft 12 and the connecting portion 82 that connects the first peripheral wall 41 with the body portion 81. The housing 11 is mounted to the vehicle 100 with the bolt 104 inserted through the hole 81a of the body portion 81 of the mounting lug 80. The connecting terminals 61 are arranged in a direction parallel to the extending direction of the hole 81a, and the dimension L1 of the connecting portion 82 in the extending direction of the hole 81a is greater than the dimension L2 between the two outermost connecting terminals 61. If any external force is applied to the housing 11 in the extending direction of the hole 81a, the connecting portion 82 receives such external force thereby to prevent the first peripheral wall 41 from being deformed to such an extent that the first peripheral wall 41 comes into contact with any of the connecting terminals 61. Accordingly, the electric compressor 10 of the present embodiment may prevent the first peripheral wall 41 and the connecting terminals 61 from contacting each other.

(3) The body portion 81 of the mounting lug 80 is disposed facing the first peripheral wall 41. This prevents the deformation of the first peripheral wall 41 effectively.

The above-described present embodiment may be modified in various manners, as exemplified below.

Figure 4:
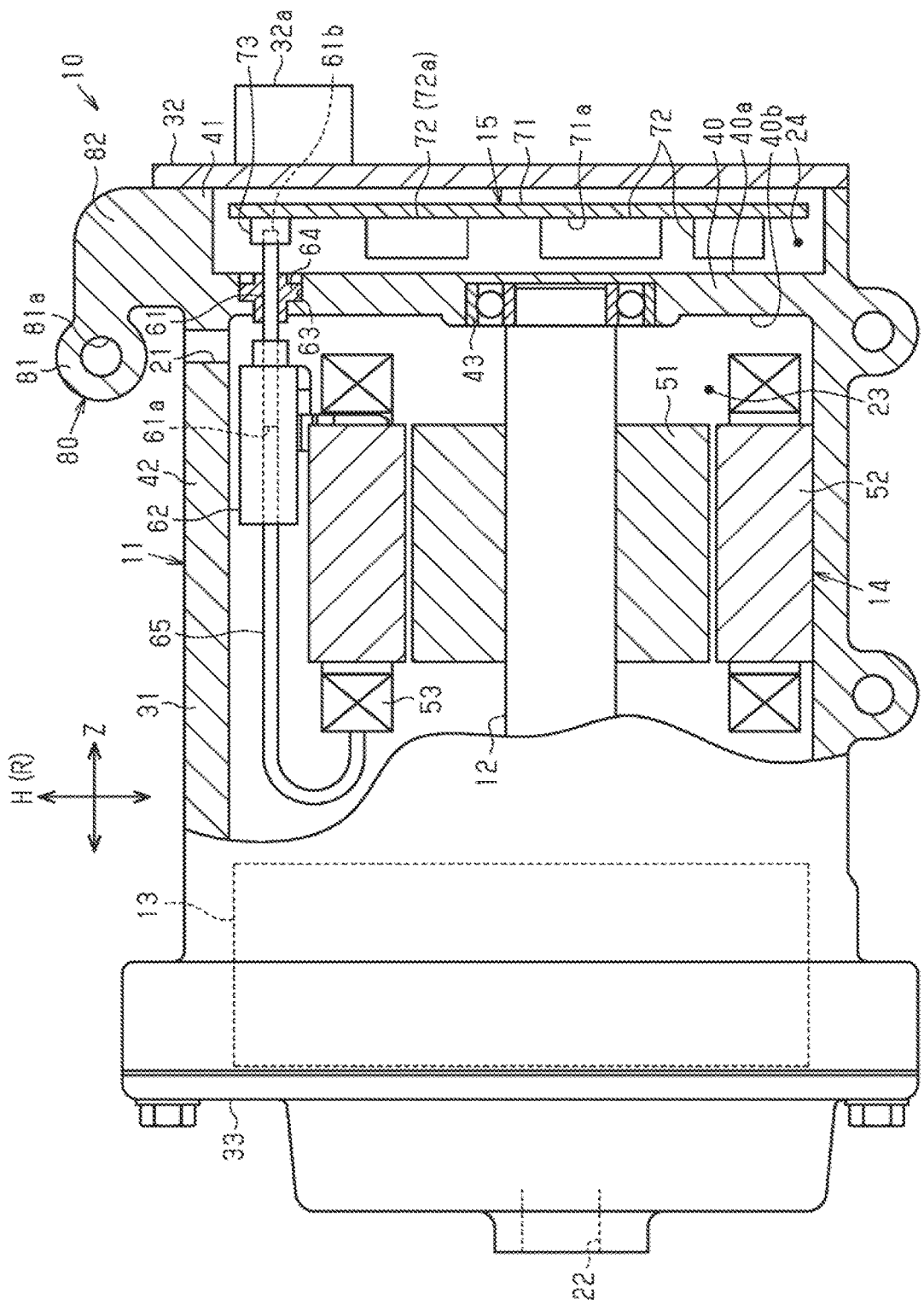
FIG. 4 is a schematic longitudinal sectional view of an electric compressor according to another example of the present invention.

The body portion 81 of the mounting lug 80 need not necessarily be formed facing the first peripheral wall 41. FIG. 4 shows an example of an embodiment in which the body portion 81 of the mounting lug 80 is formed facing the second peripheral wall 42. In this case, the connecting portion 82 is formed projecting in the parts arrangement direction H from the first peripheral wall 41 and then extending in the axial direction Z of the rotary shaft 12 so as to connect the body portion 81 with the first peripheral wall 41. Thus, the body portion 81 of the mounting lug 80 is disposed facing the second peripheral wall 42.

The mounting lug 80 is not limited to the above-described configuration, but it may be configured in any suitable manner. In other words, the electric compressor 10 need not necessarily be mounted to the vehicle 100 by the bolt 104, but any suitable method such as fitting may be used.

The cluster block 62 need not necessarily be provided.

The electronic components 72, the connecting terminal 61 and the mounting lug 80 need not necessarily be aligned on an imaginary line passing through the center M of the circuit board 71 as long as they are disposed generally in the radial direction R of the rotary shaft 12.

The electronic components 72 other than the specific electronic component 72a may be arranged in alignment with the connecting terminals 61 and the mounting lug 80 in the radial direction R of the rotary shaft 12. If a plurality of the electronic components 72 is provided, at least one of the electronic components 72 need be arranged in line with the connecting terminal 61 and the mounting lug 80 in this order in the radially outward direction with respect to the rotary shaft 12.

The first peripheral wall 41 may be formed extending from the cover 32 instead of the main housing 31. In this case, the cover 32 may have a bottomed cylindrical shape, and the first peripheral wall 41 of the cover 32 is connected to the first surface 40a of the partitioning wall 40. In such configuration, the mounting lug 80 is mounted to the cover 32 of the housing 11. In other words, the first peripheral wall 41 is formed extending in the axial direction Z of the rotary shaft 12 and cooperate with the partitioning wall 40 to form the inverter chamber 24.

The electric compressor 10 need not necessarily be mounted to the engine 101 of the vehicle 100. If the vehicle 100 is driven by a driving motor instead of the engine 101, the electric compressor 10 is mounted to the drive motor.

The vehicle 100 may be configured to be driven by a fuel cell battery or a storage battery device instead of the engine 101.

A fluid that is compressed by the electric compressor 10 is not limited to a refrigerant gas, but the electric compressor 10 of the present invention may be used to compress any fluid such as air.

The fluid machine of the present invention is not limited to the electric compressor 10. If the vehicle 100 is a fuel cell battery vehicle, an electric pump for a vehicle that supplies hydrogen to the fuel cell may be provided as a fluid machine.

What is claimed is:

1. A fluid machine for a vehicle comprising:
   a rotary shaft;
   an electric motor rotating the rotary shaft and having a coil;
   a drive circuit driving the electric motor; and
   a housing having therein a motor chamber that accommodates therein the electric motor and a circuit chamber that accommodates therein the drive circuit, the motor chamber and the circuit chamber being disposed along an axial direction of the rotary shaft, wherein
   the housing includes a partitioning wall that partitions between the motor chamber and the circuit chamber and a peripheral wall that extends from the partitioning wall in the axial direction of the rotary shaft, and the partitioning wall and the peripheral wall cooperate to form the circuit chamber,
   the drive circuit includes a circuit board having a surface that faces the partitioning wall and an electronic component mounted on the surface of the circuit board,
   the fluid machine has a connecting terminal disposed extending through the partitioning wall and electrically connecting the coil with the drive circuit,
   a mounting lug is formed extending from the peripheral wall so as to mount the housing to the vehicle,
   the electronic component, the connecting terminal and the mounting lug are disposed in this order in a radially outward direction with respect to the rotary shaft,
   the mounting lug includes a body portion having therethrough a hold extending perpendicularly to a parts arrangement direction in which the electronic component, the connecting terminal and the mounting lug are arranged and also to the axial direction of the rotary shaft, and a connecting portion connecting the peripheral wall with the body portion,
   the housing is mounted to the vehicle by a bolt inserted through the hole,
   the fluid machine has a plurality of the connecting terminals that are arranged in line along an extending direction of the hole, wherein the connecting portion extends along the extending direction of the hole, and
   a dimension of the connecting portion in the extending direction is greater than a dimension corresponding to a distance between two of the connecting terminals that are disposed outermost of the connecting terminals disposed along the extending direction of the hole.

2. The fluid machine for the vehicle according to claim 1, wherein the fluid machine includes a compression part that is driven by a rotation of the rotary shaft.

3. The fluid machine for the vehicle according to claim 1, wherein the body portion is disposed facing the peripheral wall.

4. The fluid machine for the vehicle according to claim claim 1, wherein the peripheral wall is a first peripheral wall, wherein the housing further includes a second peripheral wall that extends from the partitioning wall in a direction that is opposite from a direction in which the first peripheral wall extends, wherein the partitioning wall and the second peripheral wall cooperate to form the motor chamber, and wherein the body portion is disposed facing the second peripheral wall.

* * * * *